US009680286B2

(12) United States Patent
McCorkel

(10) Patent No.: US 9,680,286 B2
(45) Date of Patent: Jun. 13, 2017

(54) SPECTRAL AND RADIOMETRIC CALIBRATION USING TUNABLE LASERS

(71) Applicant: United States of America as represented by the Administrator of the National Aeronautics and Space Administration, Washington, DC (US)

(72) Inventor: Joel McCorkel, Washington, DC (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/868,898

(22) Filed: Sep. 29, 2015

(65) Prior Publication Data
US 2017/0093115 A1    Mar. 30, 2017

(51) Int. Cl.
| | | |
|---|---|---|
| *G02F 1/35* | (2006.01) | |
| *H01S 3/108* | (2006.01) | |
| *H01S 3/081* | (2006.01) | |
| *H01S 3/105* | (2006.01) | |
| *G02F 1/39* | (2006.01) | |
| *G02B 27/48* | (2006.01) | |
| *G02F 1/355* | (2006.01) | |

(52) U.S. Cl.
CPC ............ *H01S 3/1083* (2013.01); *G02B 27/48* (2013.01); *G02F 1/3551* (2013.01); *G02F 1/39* (2013.01); *H01S 3/0811* (2013.01); *H01S 3/0813* (2013.01); *H01S 3/105* (2013.01)

(58) Field of Classification Search
None
See application file for complete search history.

(56) References Cited

U.S. PATENT DOCUMENTS

| | | | | |
|---|---|---|---|---|
| 5,999,547 A | * | 12/1999 | Schneider | ................ G02F 1/39 359/330 |
| 6,975,402 B2 | * | 12/2005 | Bisson | ............... G01N 21/1702 356/432 |
| 7,869,471 B1 | * | 1/2011 | Yin | ........................... G02F 1/39 372/100 |
| 2002/0176472 A1 | * | 11/2002 | Arbore | ...................... G02F 1/39 372/72 |
| 2009/0245297 A1 | * | 10/2009 | Richter | ................ G02F 1/3501 372/21 |
| 2012/0236395 A1 | * | 9/2012 | Shuman | ................. G01N 21/17 359/330 |

* cited by examiner

*Primary Examiner* — Hemang Sanghavi

(57) ABSTRACT

A tunable laser system includes a tunable laser, an adjustable laser cavity for producing one or more modes of laser light emitted from the tunable laser, a first optical parametric oscillator positioned in a light path of the adjustable laser cavity, and a controller operable to simultaneously control parameters of at least the tunable laser, the first optical parametric oscillator, and the adjustable laser cavity to produce a range of wavelengths emitted from the tunable laser system. A method of operating a tunable laser system includes using a controller to simultaneously control parameters of a tunable laser, an adjustable laser cavity for producing one or more modes of laser light emitted from the tunable laser, and a first optical parametric oscillator positioned in a light path of the adjustable laser cavity, to produce a range of wavelengths emitted from the tunable laser system.

15 Claims, 3 Drawing Sheets

SPECTRAL AND RADIOMETRIC CALIBRATION USING TUNABLE LASERS

INVENTION BY GOVERNMENT EMPLOYEE(S) ONLY

The invention described herein was made by one or more employees of the United States Government, and may be manufactured and used by or for the Government for governmental purposes without the payment of any royalties thereon or therefor.

BACKGROUND

The disclosed embodiments generally relate to calibration processes and more particularly to verifying irradiance and radiance characteristics of a sensor.

Previously developed laser based facilities for spectral irradiance and radiance responsivity calibrations typically use a number of sources for calibrating instruments or sensors directly in irradiance or radiance mode. Generally, the emission from high-power, tunable lasers is introduced into an integrating sphere using optical fibers, producing uniform, quasi-Lambertian, high-radiant-flux sources. Reference standard irradiance detectors, calibrated directly against national primary standards for spectral power responsivity and aperture area measurement, are used to determine the irradiance at a reference plane. The source radiance may also be readily determined using the measurement geometry. The facilities typically use multiple lasers, in some cases, dye lasers, to cover a spectral region from 415-700 nm, and Ti:sapphire lasers to cover the spectral range from 350-500 nm with frequency doubling, and from 680-1050 nm.

It would be advantageous to provide an apparatus and method to perform irradiance and radiance responsivity calibrations that uses a tunable laser system to overcome these and other disadvantages.

SUMMARY

The disclosed embodiments are directed to a tunable laser system including a tunable laser, an adjustable laser cavity for producing one or more modes of laser light emitted from the tunable laser, a first optical parametric oscillator positioned in a light path of the adjustable laser cavity, and a controller operable to simultaneously control parameters of at least the tunable laser, the first optical parametric oscillator, and the adjustable laser cavity to produce a range of wavelengths emitted from the tunable laser system.

The tunable laser system may further include a second optical parametric oscillator positioned in a path of light emitted from the adjustable laser cavity, and a compensator positioned in a path of light emitted from the second optical parametric oscillator.

The controller may be operable to simultaneously control the parameters of at least the tunable laser, the first optical parametric oscillator, and the adjustable laser cavity, while controlling the parameters of the second optical parametric oscillator and the compensator to produce the range of wavelengths emitted from the tunable laser system.

The parameters of the tunable laser may include a frequency of the tunable laser.

The parameters of the first optical parametric oscillator may include a temperature of a crystal of the first optical parametric oscillator.

The parameters of the adjustable laser cavity may include a cavity length of the adjustable laser cavity.

The parameters of the adjustable laser cavity may include a position of one or more optical components of the adjustable laser cavity.

The parameters of the second optical parametric oscillator may include a rotational position of a crystal of the second optical parametric oscillator.

The parameters of the compensator include a rotational position of the compensator.

The disclosed embodiments are also directed to a method of operating a tunable laser system including using a controller to simultaneously control parameters of a tunable laser, an adjustable laser cavity for producing one or more modes of laser light emitted from the tunable laser, and a first optical parametric oscillator positioned in a light path of the adjustable laser cavity, to produce a range of wavelengths emitted from the tunable laser system.

The method includes using the controller to control the parameters of at least the tunable laser, the first optical parametric oscillator, and the adjustable laser cavity, while controlling the parameters of a second optical parametric oscillator positioned in a path of light emitted from the adjustable laser cavity and a compensator positioned in a path of light emitted from the second optical parametric oscillator.

The method includes controlling a frequency of the tunable laser.

The method also includes controlling a temperature of a crystal of the first optical parametric oscillator.

The method further includes controlling a cavity length of the adjustable laser cavity.

The method still further includes controlling a cavity length of the adjustable laser cavity by controlling a position of one or more optical components of the adjustable laser cavity.

The method additionally includes controlling a rotational position of a crystal of the second optical parametric oscillator.

The method likewise includes controlling a rotational position of the compensator.

The disclosed embodiments are also directed to a radiometric calibration system having an integrating sphere for illuminating a radiometer under test, a shutter providing an optical signal to the integrating sphere, and tunable laser system providing an optical signal to the shutter.

The tunable laser system may include a tunable laser, an adjustable laser cavity for producing one or more modes of laser light emitted from the tunable laser, a first optical parametric oscillator positioned in a light path of the adjustable laser cavity, and a controller operable to simultaneously control parameters of at least the tunable laser, the first optical parametric oscillator, and the adjustable laser cavity to produce a range of wavelengths emitted from the tunable laser system.

The radiometric calibration system may also include a second optical parametric oscillator positioned in a path of light emitted from the adjustable laser cavity, and a compensator positioned in a path of light emitted from the second optical parametric oscillator, and the controller may be operable to simultaneously control the parameters of at least the tunable laser, the first optical parametric oscillator, and the adjustable laser cavity, while controlling the parameters of the second optical parametric oscillator and the compensator to produce the range of wavelengths emitted from the tunable laser system.

BRIEF DESCRIPTION OF THE DRAWINGS

The foregoing aspects and other features of the embodiments are explained in the following description, taken in connection with the accompanying drawings, wherein.

DETAILED DESCRIPTION

The disclosed embodiments are directed to a calibration system incorporating an automated tunable laser system for spectral irradiance and radiance responsivity calibrations. Components of the laser system are controlled together so that instruments may be calibrated directly in irradiance or radiance mode. The laser system produces an output over a wide range of frequencies by automatically controlling at least a mode locked pumped laser, a first optical parametric oscillator crystal temperature a laser cavity length, an angle of a second optical parametric oscillator, and an angle of a compensator.

Figure 1:
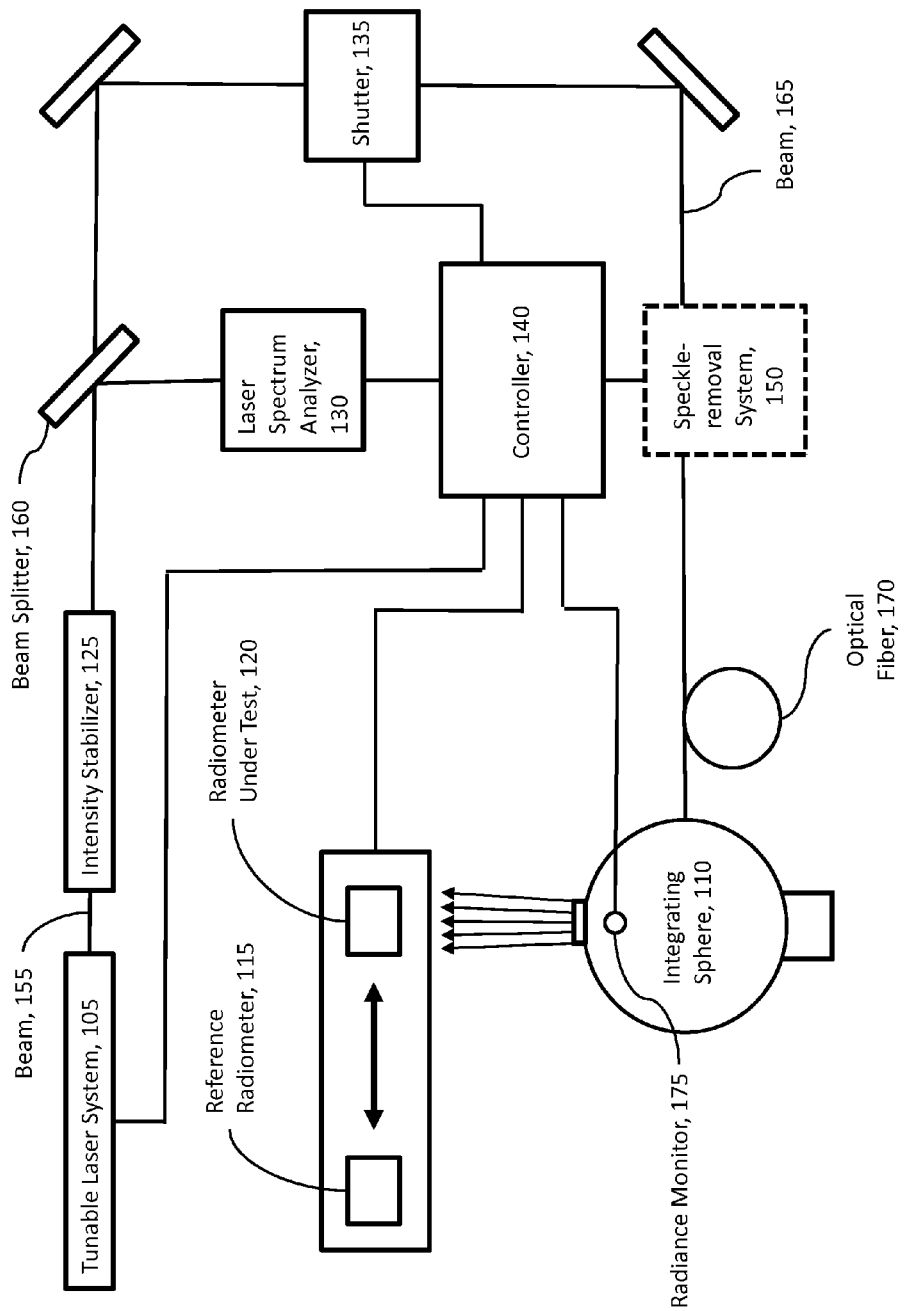
FIG. 1 shows an exemplary block diagram of a calibration system incorporating the disclosed embodiments.

FIG. 1 shows a schematic block diagram of an exemplary calibration system 100 incorporating the automated tunable laser system 105 according to the disclosed embodiments. Emission from the automated tunable laser system 105 is provided to an integrating sphere 110 which is used to illuminate a reference radiometer 115 and at least one radiometer under test 120. The calibration system 100 further includes an intensity stabilizer 125, laser spectrum analyzer 130, a shutter 135, a controller 140, and an optional speckle remover system 150.

A beam 155 output from the tunable laser system 105 may be stabilized by the intensity stabilizer 125. The intensity stabilizer may be a commercial off the shelf device and generally operates to reduce noise and intensity drift of the output beam. A portion of the beam from the intensity stabilizer 125 may be reflected by a beam splitter 160 to the laser spectrum analyzer 130 for measuring signal power versus wavelength or frequency and providing the results to the controller 140. The remainder of the beam from the intensity stabilizer 125 may be reflected to the shutter 135 used to periodically block the beam. The beam 165 from the shutter 135 may be routed to an optional speckle removal system 150 utilized to reduce speckle due to coherence properties of the beam 165. The beam may then be routed from the speckle removal system 150 through an optical fiber 170 to the integrating sphere 110. A radiance monitor 175 may be attached to or otherwise positioned to monitor the output of the integrating sphere 110.

Figure 2:
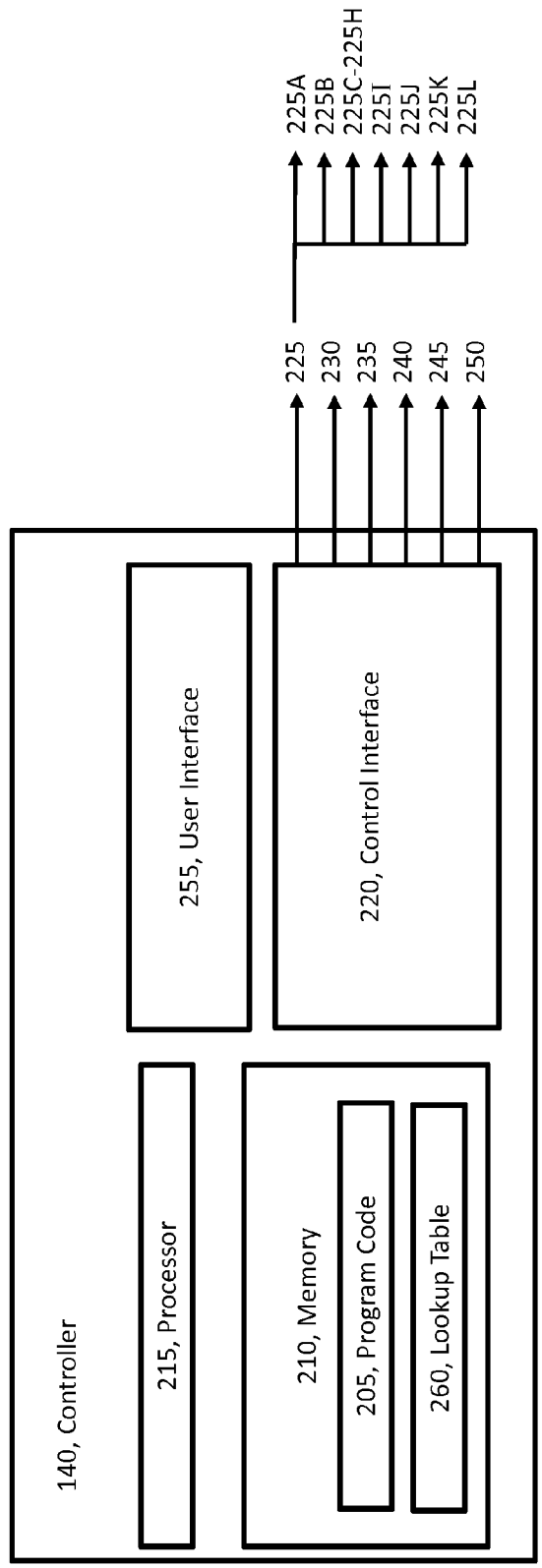
FIG. 2 shows a block diagram of a controller for use with the disclosed embodiments.

A schematic block diagram of an exemplary controller 140 is shown in FIG. 2. The controller 140 generally includes computer readable program code 205 stored on at least one computer readable medium for carrying out and executing the process steps described herein. The computer readable medium may be a memory 210 of the controller 140. In alternate aspects, the computer readable program code may be stored in a memory external to, or remote from, the controller 140. The memory 210 may include magnetic media, semiconductor media, optical media, or any media which is readable and executable by a computer.

The controller 140 may also include a processor 215 for executing the computer readable program code 205. In at least one aspect, the controller 140 may include one or more input or output devices, including a control interface 220 that provides signals for exchanging information with and for controlling one or more devices of the calibration system 100. For example, the control interface 220 may provide control signals 225 for the laser system 105, control signals 230 for the laser spectrum analyzer 130, control signals 235 for the shutter 135, control signals 240 for the speckle removal system 150, control signals 245 for the radiance monitor 175, and control signals 250 for the reference radiometer and radiometer under test 120. The controller 140 may also include a user interface 255 for exchanging information and commands with a user.

Figure 3:
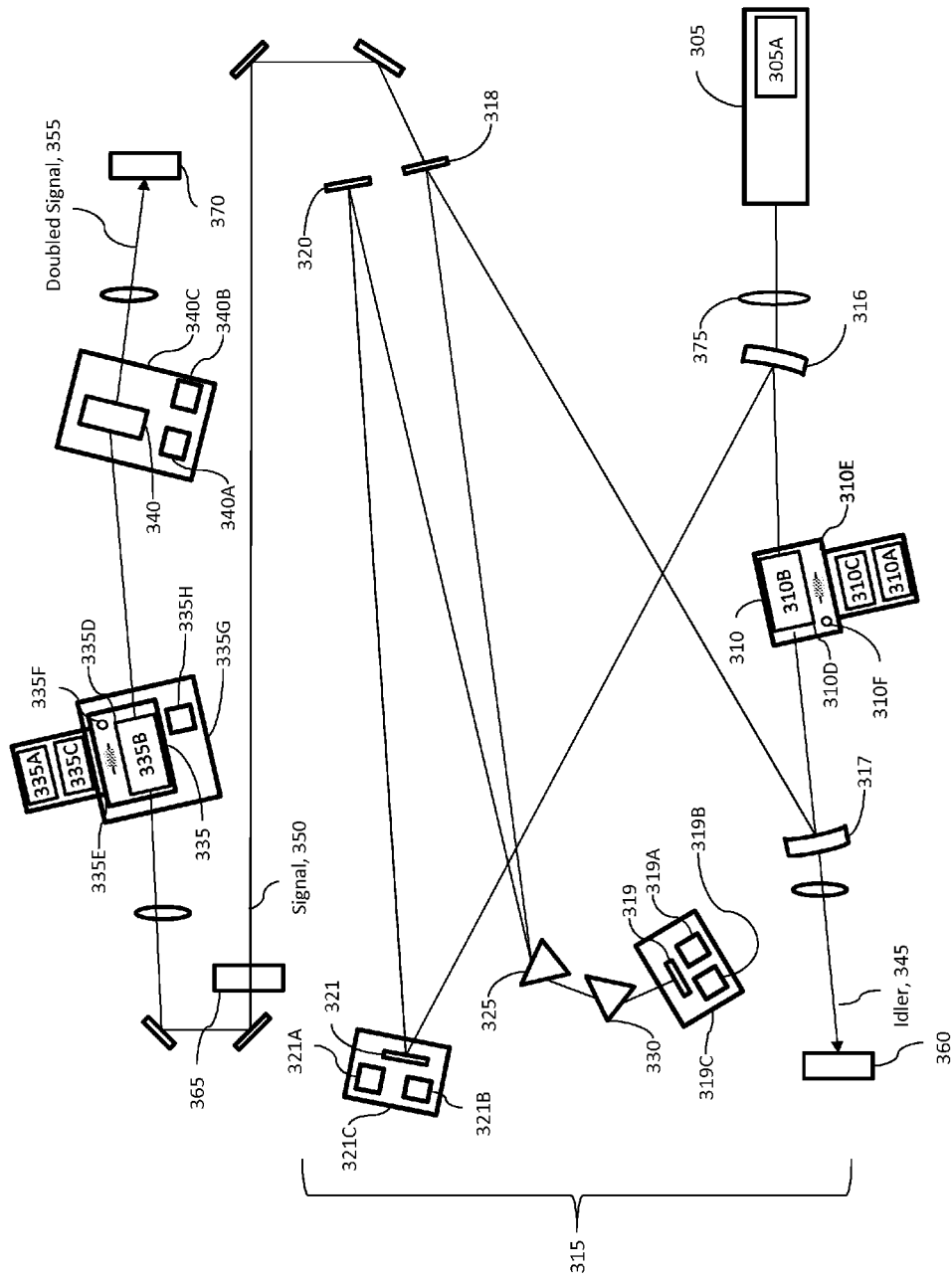
FIG. 3 shows an example of a tunable laser system according to the disclosed embodiments.

An example of the tunable laser system 105 is shown in FIG. 3. The tunable laser system 105 may include a tunable laser 305, a first optical parametric oscillator 310, an adjustable laser cavity 315 defined by mirrors 316-321 and prisms 325, 330, and a second optical parametric oscillator 335 and compensator 340 for producing a doubled signal. The tunable laser system 105 may have three outputs, an idler output 345, a signal output 350, and a doubled signal output 355. Each of the outputs 345, 350, 355 may include a corresponding optical coupler 360, 365, 370 for coupling each output 345, 350, 355 to the intensity stabilizer 125 (FIG. 1) as beam 155 (FIG. 1).

Referring to FIG. 2, the laser system control signals 225 from the controller 104 may include control signals 225A for controlling the tunable laser 305, control signals 225B for controlling the first optical parametric oscillator 310, control signals 225C-225H for controlling mirrors 316-321, control signals 2251-225J for controlling prisms 325, 330, control signals 225K for controlling the second optical parametric oscillator 335, and control signals 225L for controlling the compensator 340. In some embodiments control signals 225A-225L may be connected as individual signal groups between the controller 104 and each tunable laser system component. In one or more embodiments, control signals 225A-225L may be included in a common bus connecting the components of the tunable laser system 105 together.

Turning to FIG. 3, the tunable laser 305 may be, for example, a Ti:sapphire, 20 W, 532 nm, mode-locked pump laser with an 80 MHz repetition rate. The tunable laser 305 may include a communication port 305A for exchanging data and commands with the controller 140 using control signals 225A. For example, the controller 140 may issue commands to the communication port 305A for setting the energy output and frequency, and for requesting status and operating parameters and conditions of the laser 305, while the communication port 305A may provide status reports and a list of current operating parameters and conditions to the controller 104.

The first optical parametric oscillator 310 may at least include a communications port 310A, a crystal 310B, and a temperature controller 310C. The communication port 310A may operate to exchange data and commands with the controller 140 using control signals 225B. The crystal may be a non-linear optical crystal, for example, a lithium triborate or LBO ($LiB_3O_5$) crystal. Other crystals may also be used such as ADP ($NH_4H_2PO_4$), KDP ($KH_2PO_4$), KTP ($KTiOPO_4$), lithium niobate ($LiNBO_3$), or any other suitable crystal material. The temperature controller 310C may generally control the temperature of the crystal 310B. The crystal 310B may be enclosed in an oven 310D whose temperature may be controlled by the temperature controller 310C. In some embodiments, a heat source 310E may be located proximate the crystal and may be controlled by the temperature controller 310C. It should be understood that the temperature controller 310C may control any suitable device or mechanism for maintaining the crystal 310B at a particular temperature. The controller 140 may issue commands through the communication port 310A for setting the temperature of the crystal 310B and for requesting a measured crystal temperature. A sensor 310F may be mounted proximate the crystal 310B for measuring the temperature of the crystal 310B, and may further provide the measured temperature to the controller 140, for example, in response to the commands from the controller 140.

The adjustable laser cavity 315 may be generally defined by a number of optical components including mirrors 316-321 and prisms 325, 330. In at least one embodiment, the adjustable laser cavity 315 has a bowtie configuration. Mirrors 316 and 317 may be concave mirrors whose focus is the crystal 310B. In some embodiments, one or more of the optical components of the adjustable laser cavity 315 may be controlled by the controller 140. For example, a position of mirrors 319 and 321 may be manipulated as a result of one or more of signals 225C-225H from the controller 140. In at least one embodiment, signals 225F may control mirror 319 and signals 225H may control mirror 321. Each of mirrors 319 and 321 may be mounted on a stage 319C, 321C, respectively and each stage may include a communications port 319A, 321A, respectively, and an actuator 319B, 321B, respectively. Each of the communication ports 319A, 321A, may generally operate to exchange data and commands with the controller 140. Each of the actuators may be a motorized, single or multi-axis actuator. The controller 140 may issue commands for operating each of the actuators 319B, 321B to translate, rotate or otherwise move the mirrors 319, 321 to a particular position.

In at least one embodiment, actuator 319B may operate to rotate mirror 319 and actuator 321B may operate to translate mirror 321, but it should be understood that the actuators 319B, 321B may provide any suitable movement of the mirrors 319, 321. While the actuators 319B, 321B are shown proximate mirrors 319, 321, it should be understood that he actuators may be situated in any suitable location and may be remote from the mirrors 319, 321. The controller 140 may also send commands to the communication ports 319A, 321A for requesting an operating status, position, orientation or other information from the actuators 319B, 321B. Movement of the mirrors 319, 321 may operate to change a length of the laser cavity 315.

The second optical parametric oscillator 335 may at least include a communications port 335A, a crystal 335B, and a temperature controller 335C. The communication port 335A may operate to exchange data and commands with the controller 140 using control signal 225K. The crystal may be a non-linear optical crystal, for example, a bismuth triborate or BiBO ($BiB_3O_5$) crystal. The temperature controller 335C may generally control the temperature of the crystal 335B. The crystal 335B may be enclosed in an oven 335D whose temperature may be controlled by the temperature controller 335C. In some embodiments, a heat source 335E may be located proximate the crystal and may be controlled by the temperature controller 335C. It should be understood that the temperature controller 335C may control any suitable device or mechanism for maintaining the crystal 335B at a particular temperature. The controller 140 may issue commands through the communication port 335A for setting the temperature of the crystal 335B and for requesting a measured crystal temperature. A sensor 335F may be mounted proximate the crystal 335B for measuring the temperature of the crystal 335B, and may further provide the measured temperature to the controller 140, for example, in response to the commands from the controller 140.

A position of the second optical parametric oscillator 335 may be manipulated as a result of control signal 225K from the controller 140. The second optical parametric oscillator 335 may be mounted on a stage 335G which may include an actuator 335H. The actuator 335H may be a motorized, single or multi-axis actuator. The controller 140 may issue commands for operating the actuator 335H to translate, rotate or otherwise move the second optical parametric oscillator 335 to a particular position. In at least one embodiment, actuator 335H may operate to rotate the second optical parametric oscillator 335, but it should be understood that the actuator 335H may provide any suitable movement of the second optical parametric oscillator 335. While the actuator 335H is shown proximate the second optical parametric oscillator 335, it should be understood that the actuator may be situated in any suitable location and may be remote from the second optical parametric oscillator 335. The controller 140 may also send commands to the communication port 335A for requesting an operating status, position, orientation or other information from the actuator 335H.

Optical compensator 340 may comprise, for example, a cuboid or other suitable shape of fused silicon, for compensating for beam translation caused by the angle of the second optical parametric oscillator 335. The optical compensator 340 may include a communication port 340A and an actuator 340B and may be mounted on a stage 340C. The communication port 340A may generally operate to exchange data and commands with the controller 140 through control signals 225L. The controller 140 may issue commands for operating the actuator 340B to rotate or otherwise move the optical compensator 340. The controller 140 may also send commands to the communication port 340A for requesting an operating status, position, orientation or other information from the actuator 340B.

While mirrors 319 and 321, first and second optical parametric oscillators, 310,335 and optical compensator 340 are described as movable, it should be understood that any of the components of the tunable laser system 105 may be movable or otherwise controlled by the controller 140. It should also be understood that the tunable laser system 105 may include additional components, for example, lenses and mirrors for focusing and guiding the light beams through the system 105.

Light for the tunable laser system 105 is generated by the tunable laser 305 and passes through lens 375 and mirror 316 and through crystal 310B. The idler output 345 of the crystal 310B is directed to output coupler 360, while the signal output is directed to mirror 318. The light from mirror 318 is directed to prisms 325 and 330 and is reflected back through prisms 330 and 325 from mirror 319 to mirror 320. Light from mirror 320 is reflected to mirror 321, back to mirror 316 and then to crystal 310B.

Laser system parameters for operating the tunable laser system 105 may be obtained by selecting a desired idler output 345 wavelength or a signal output 350 wavelength, and incrementally adjusting the temperature of the crystal 310B in the first optical parametric oscillator 310, the angle of mirror 319, and the translation of mirror 321. Additional laser system parameters for operating the tunable laser system 105 may be obtained by selecting a desired doubled signal output 355, and incrementally adjusting the temperature of the crystal 310B in the first optical parametric oscillator 310, the angle of mirror 319, the translation of mirror 321, the angle of the crystal 335B in the second optical parametric oscillator 335, and the angle of the compensator 340, until the desired double signal output 355 wavelength is stable. The laser system parameters output wavelength, temperature of crystal 310B, angle of mirror 319, translation of mirror 321 angle of the crystal 335B and the angle of the compensator 340 may be stored in a multi-dimensional lookup table 260 (FIG. 2) for each output wavelength. The table may reside in memory 210 of the controller 140. Cavity parameters may be collected for each individual wavelength over the tuning range of the tunable laser system or may be collected at wavelength intervals, for example, every 10 nm, or some other suitable interval. In some embodiments, the controller may use an interpolation scheme to determine parameters between data points.

By adjusting the temperature of the crystal 310B, and the positions of mirrors 319 and 321, an output of 200 nm-300 nm may be achieved at the idler output 345 and an output of 700 nm-1000 nm may be achieved at the signal output 350. By adjusting the temperature of the crystal 310B, the positions of mirrors 319 and 321, the angle of crystal 335B, and the angle of the compensator 340, an output of 350 nm-500 nm may be achieved at the doubled signal output 355.

Once the multi-dimensional table 260 has been constructed, the tunable laser system 105 may be operable to provide outputs 345, 350, 355 over a wide range of wavelengths by automatically controlling parameters of the tunable laser system 105 and without switching lasers. For example, the controller 140 may run a program embodied as computer readable program code 205 stored in memory 210, that accepts a start wavelength, an end wavelength, an increment or step, a light time, and a dark time, and may accept these parameters through the user interface 255. Exemplary parameters may be a start wavelength of 400 nm, an end wavelength of 500 nm, an interval of 1 nm, a light time of 30 s, and a dark time of 30 s. The controller may provide signals 235 to shutter 135 to block the beam 165 (FIG. 1) for the dark time. The controller may then access the lookup table 260 to determine the temperature of the crystal 310B, the angle of mirror 319, the translation of mirror 321, the angle of the crystal 335B, and the angle of the compensator 340 to achieve the start wavelength, and provide control signals 225B, 225F, 225H, 225K, and 225L to temperature controller 310C, actuator 319B, actuator 321B, actuator 335H, and actuator 340B, respectively to set the temperature of the crystal 310B, the angle of mirror 319, the translation of mirror 321, the angle of the crystal 335B, and the angle of the compensator 340. When the optical components are in position, and the dark time expires, the controller may provide signals 235 to shutter 135 to open the beam 165 for the light time, and read the output of the radiometer under test 120 through control signals 250. When the light time expires, the controller may provide signals 235 to shutter 135 to block the beam 165 for the dark time, and access the lookup table 260 to determine the temperature of the crystal 310B, the angle of mirror 319, the translation of mirror 321, the angle of the crystal 335B, and the angle of the compensator 340 to achieve the start wavelength incremented by the interval, and provide control signals 225B, 225F, 225H, 225K, and 225L accordingly. This process may continue until the end wavelength is reached.

By automatically controlling the optical components of the tunable laser system 104, the calibration system 100 may provide a more complete calibration by providing calibration with fine spectral sampling over a wide spectrum, in an automated, repeatable manner.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

The invention claimed is:

1. A tunable laser system comprising:
   a tunable laser;
   an adjustable laser cavity for producing one or more modes of laser light emitted from the tunable laser;
   a first optical parametric oscillator positioned in a light path of the adjustable laser cavity;
   a second optical parametric oscillator positioned in a path of light emitted from the adjustable laser cavity; and
   a compensator positioned in a path of light emitted from the second optical parametric oscillator; and
   a controller operable to simultaneously control parameters of at least the tunable laser, the first optical parametric oscillator, and the adjustable laser cavity to produce a range of wavelengths emitted from the tunable laser system wherein the controller is operable to simultaneously control the parameters of at least the tunable laser, the first optical parametric oscillator, and the adjustable laser cavity, while controlling the parameters of the second optical parametric oscillator and the compensator to produce the range of wavelengths emitted from the tunable laser system.

2. The tunable laser system of claim 1 wherein the parameters of the tunable laser include a frequency of the tunable laser.

3. The tunable laser system of claim 1 wherein the parameters of the first optical parametric oscillator includes a temperature of a crystal of the first optical parametric oscillator.

4. The tunable laser system of claim 1 wherein the parameters of the adjustable laser cavity include a cavity length of the adjustable laser cavity.

5. The tunable laser system of claim 1 wherein the parameters of the adjustable laser cavity include a position of one or more optical components of the adjustable laser cavity.

6. The tunable laser system of claim 1 wherein the parameters of the second optical parametric oscillator include a rotational position of a crystal of the second optical parametric oscillator.

7. The tunable laser system of claim 1 wherein the parameters of the compensator include a rotational position of the compensator.

8. A method of operating a tunable laser system comprising:
   using a controller to simultaneously control parameters of:
   a tunable laser;
   an adjustable laser cavity for producing one or more modes of laser light emitted from the tunable laser; and
   a first optical parametric oscillator positioned in a light path of the adjustable laser cavity;
   further using the controller to control the parameters of at least the tunable laser, the first optical parametric oscillator, and the adjustable laser cavity, while controlling the parameters of:

a second optical parametric oscillator positioned in a path of light emitted from the adjustable laser cavity; and a compensator positioned in a path of light emitted from the second optical parametric oscillator to produce a range of wavelengths emitted from the tunable laser system.

9. The method of claim 8 further comprising controlling a frequency of the tunable laser.

10. The method of claim 8 further comprising controlling a temperature of a crystal of the first optical parametric oscillator.

11. The method of claim 8 further comprising controlling a cavity length of the adjustable laser cavity.

12. The method of claim 11 comprising controlling a cavity length of the adjustable laser cavity by controlling a position of one or more optical components of the adjustable laser cavity.

13. The method of claim 8 further comprising controlling a rotational position of a crystal of the second optical parametric oscillator.

14. The method of claim 8 further comprising controlling a rotational position of the compensator.

15. A radiometric calibration system comprising:
an integrating sphere for illuminating a radiometer under test;
a shutter providing an optical signal to the integrating sphere; and
tunable laser system providing an optical signal to the shutter, the tunable laser system comprising:
a tunable laser;
an adjustable laser cavity for producing one or more modes of laser light emitted from the tunable laser;
a first optical parametric oscillator positioned in a light path of the adjustable laser cavity;
a controller operable to simultaneously control parameters of at least the tunable laser, the first optical parametric oscillator, and the adjustable laser cavity to produce a range of wavelengths emitted from the tunable laser system;
a second optical parametric oscillator positioned in a path of light emitted from the adjustable laser cavity; and
a compensator positioned in a path of light emitted from the second optical parametric oscillator;
wherein the controller is operable to simultaneously control the parameters of at least the tunable laser, the first optical parametric oscillator, and the adjustable laser cavity, while controlling the parameters of the second optical parametric oscillator and the compensator to produce the range of wavelengths emitted from the tunable laser system.

* * * * *

UNITED STATES PATENT AND TRADEMARK OFFICE
CERTIFICATE OF CORRECTION

PATENT NO. : 9,680,286 B2  
APPLICATION NO. : 14/868898  
DATED : June 13, 2017  
INVENTOR(S) : Joel McCorkel Page 1 of 1

It is certified that error appears in the above-identified patent and that said Letters Patent is hereby corrected as shown below:

On the Title Page

Item (72), please add the following Inventors:  
Dr. Steven W. Brown  
Dr. John T. Woodward IV  
Dr. Brendan McAndrew Signed and Sealed this  
Twenty-third Day of April, 2019

Andrei Iancu  
*Director of the United States Patent and Trademark Office*